Aug. 24, 1926.
F. AHLBURG
1,597,561
SEPARATING MACHINE
Filed Sept. 19, 1922
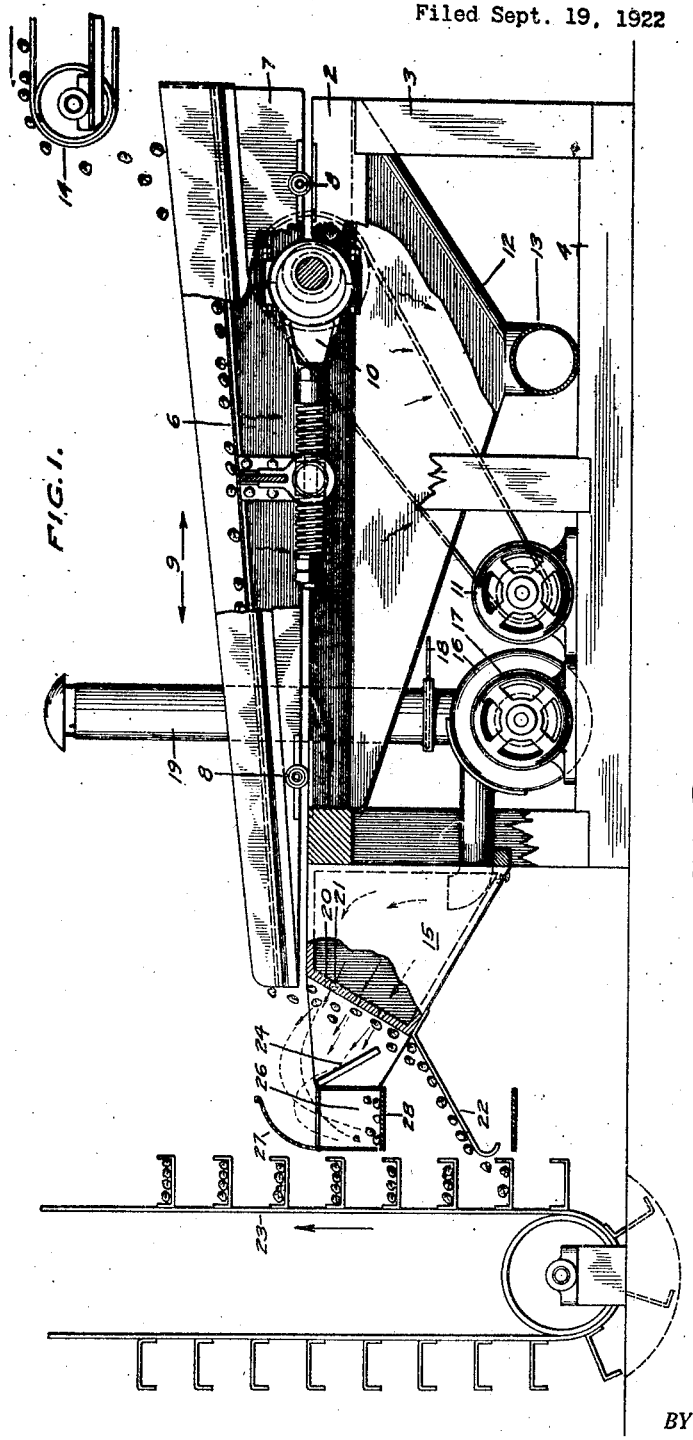
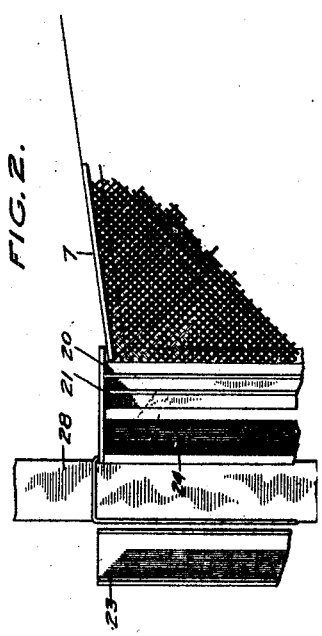
INVENTOR.
Frank Ahlburg.
BY White Prost & Evans
ATTORNEYS.
WITNESS.

Patented Aug. 24, 1926.

1,597,561

UNITED STATES PATENT OFFICE.

FRANK AHLBURG, OF LOS ANGELES, CALIFORNIA.

SEPARATING MACHINE.

Application filed September 19, 1922. Serial No. 589,054.

My invention relates to devices for sorting sound from unsound nuts.

An object of the invention is to provide means for separating nuts from dirt, broken shells and other foreign matter.

Another object of the invention is to provide means for separating the sound nuts from the unsound nuts, delivering each into separate receptacles or conveyors.

My invention possesses many other objects and features of advantage, some of which, with the foregoing, will be set forth in the following description of my invention. It is to be understood that I do not limit myself to the showing made by the said description, as I may adopt variant forms of the invention within the scope of the claims.

Fig. 1 is a side elevation of my device, parts being broken away to disclose its construction. Fig. 2 is a fragmentary plan view of the sorting and delivery end of my device.

There is a marked difference in weight between sound nuts and nuts in which the meat is diseased or undeveloped or shriveled. I have taken advantage of this difference, in the specific gravity of sound and unsound nuts, to effect the sorting of the unsound or light nuts from the sound or heavy nuts, by means of the varying reactions of these nuts to the agencies I employ.

In the preferred form of my invention I provide a frame 2 supported by legs 3 and a base 4, and on which is mounted a foraminated table 6. The table is disposed on a slight angle in a frame 7 supported by rollers 8 on the frame 2 and is reciprocally vibrated longitudinally, that is, in the direction of the arrows 9 by means of a suitable eccentric mechanism 10 driven by a motor 11. The frame 2 is further provided with a dust collector 12 to receive the material sifting down from the table, and this collector is connected to an air suction line 13. Any suitable means, such as the conveyor 14, is provided for dumping nuts upon the table.

Mounted adjacent the lower end of the foraminated table on the frame 2, and extending under and across the width of the table is an air box 15. Air is supplied under pressure to the box from a blower 16 driven by a motor 17 mounted in the frame 2. The air pressure in the box is controlled by a valve 18 on the intake pipe 19 of the blower.

The front wall of the air box comprises a steeply inclined chute or slide 20 upon which the nuts are allowed to fall. In the slide are formed slots 21 extending transversely thereacross. A discharge chute is arranged below the slotted chute, and extends outwardly to the bucket conveyor 23. Disposed opposite the apertures 21 and inclined away from the slide 19 is a guide plate 24 on the far side of which is an open cull receiver 26. A screen 27 to deflect the culls into the receiver is arranged on the far wall thereof. The floor of the cull receiver is formed by a conveyor belt 28, the lower reach of which is shown below the discharge chute 22.

Operation. Nuts are deposited on the vibrating table from the conveyor 14 and as they travel down the incline are separated from the dirt and other foreign matter, which falls thru the table to the dust collector and is discharged thru the pipe 13.

At the lower end of the table the nuts drop off in a wide flat stream upon the upper end of the chute, thru the slots of which are flowing streams of air at a pressure and volume determined by adjustment of the valve 18. As the nuts encounter the streams of air the culls which are lighter than the sound nuts together with broken shells and all light foreign matter are entrained in the air currents and carried up into the cull receiver as indicated by the dotted lines in Fig. 1. Nuts striking the guide plate 24, or the screen 27, are deflected into the cull receiver 26 permitting the air currents to proceed without deflection, or the production of eddies which would tend to scatter the culls. The sound nuts, because of their weight, will fall thru the air streams onto the discharge chute, from which they fall into the bucket conveyor which carries them to a convenient place for packing.

I claim:

1. A nut separating machine comprising a slotted chute, means for producing a pneumatic pressure behind said chute to cause an upwardly directed blast of air to flow thru the slots of said chute, a pair of conveyors adjacent said chute, means for dropping nuts to be separated upon the upper end of said chute whereby the unsound nuts are entrained in the stream of air thru said slots and deposited on one conveyor, and the sound nuts fall thru said air stream and are deposited in the other conveyor.

2. A nut separating machine comprising a slotted chute, means for producing a pneumatic pressure behind said chute to cause an upwardly directed blast of air to flow thru the slots of said chute, a pair of conveyors adjacent said chute, means for dropping nuts to be separated upon the upper end of said chute whereby the unsound nuts are entrained in the stream of air thru said slots and the sound nuts fall thru said air stream, and means for guiding the separated nuts into said conveyors.

3. A nut separator comprising a slotted chute, means for producing pneumatic pressure behind said chute to cause an upwardly directed blast of air to flow thru the slots of said chute, an inclined foraminated table to receive the nuts and having its discharge edge over said chute, means for vibrating said table to feed the nuts thereon toward said discharge end, a conveyor under the discharge end of said slotted chute to catch the sound nuts which fall thru the flow of air, and a conveyor spaced in front of said chute to catch the unsound nuts entrained in the flow of air.

4. A nut separator comprising a slotted chute, means for producing pneumatic pressure behind said chute to cause an upwardly directed blast of air to flow thru the slots of said chute, an inclined foraminated table for receiving the nuts and having its discharge edge over said chute, means for vibrating said table to feed the nuts thereon toward said discharge edge, a receptacle below said table to receive the fine particles passing therethru, a suction line for exhausting said receptacle, a conveyor under the discharge end of said slotted chute to catch the sound nuts falling thru the flow of air, and a conveyor spaced in front of said chute to catch the unsound nuts entrained in the flow of air.

5. A nut separating machine comprising a steeply inclined chute having a plurality of slots extending thereacross, means for producing pneumatic pressure behind said chute to cause an upwardly directed blast of air to flow thru the slots of said chute, means for dropping articles to be separated into said flow of air, a conveyor under the discharge end of said slotted chute to catch the sound nuts falling thru the flow of air, and a conveyor spaced in front of said chute to catch the unsound nuts entrained in the flow of air.

6. A nut separating machine comprising a conveyor adapted to convey nuts toward one end of the same, a downwardly inclined chute disposed at said end of the conveyor down which nuts discharged from the conveyor are adapted to gravitate, means for producing a pneumatic pressure behind said chute to cause upwardly directed blasts of air to pass thru apertures in the chute, means in front of said chute and spaced therefrom to receive unsound nuts, and means at the bottom of the chute to receive sound nuts.

In testimony whereof, I have hereunto set my hand.

FRANK AHLBURG.